May 20, 1958        D. H. KAPLAN        2,835,456
CONTROL MECHANISM FOR A CONVERTIBLE AIRCRAFT
Filed July 13, 1954        2 Sheets-Sheet 1
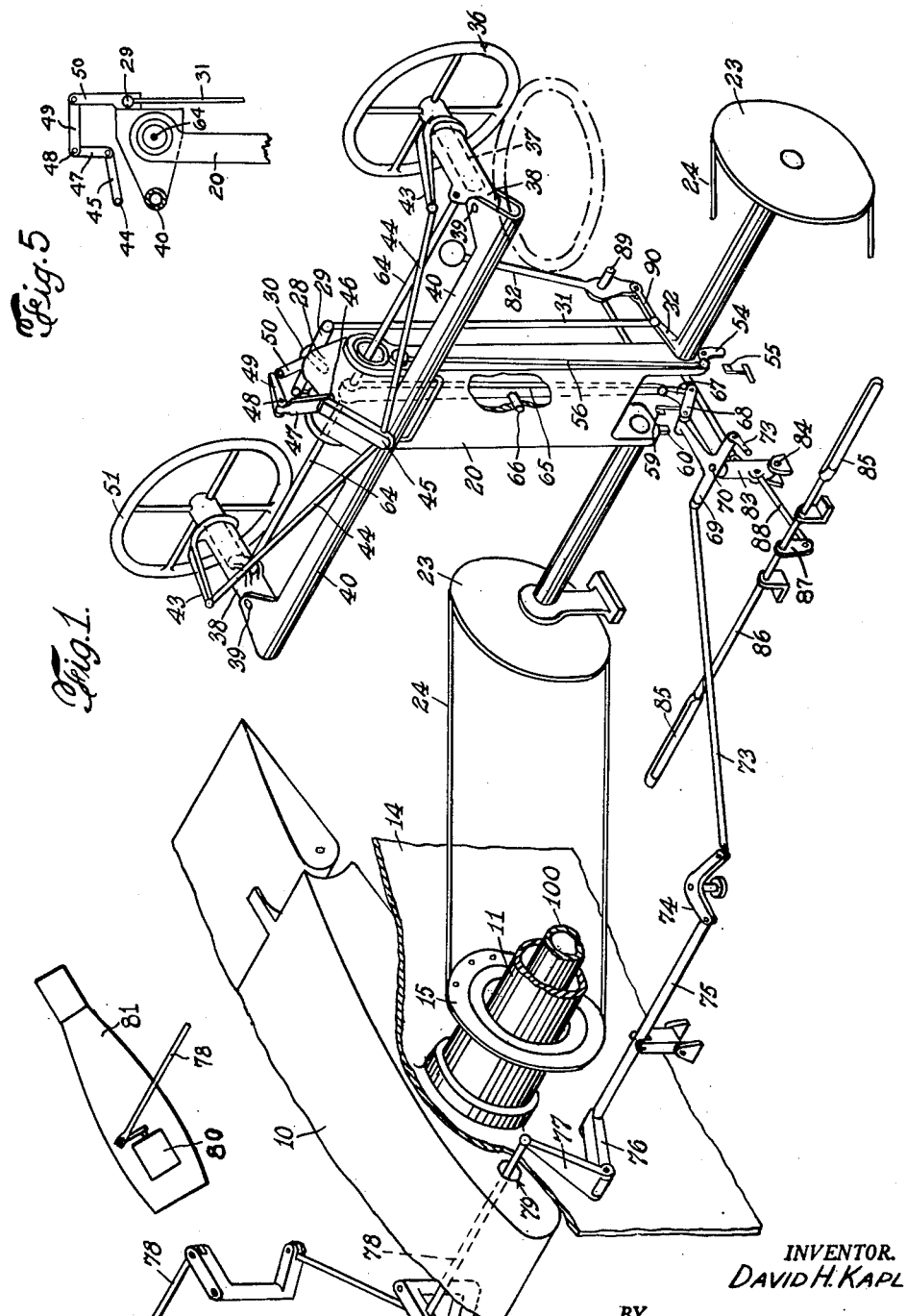
INVENTOR.
DAVID H. KAPLAN
BY
Bohleber, Jackett & Montstream
ATTORNEYS May 20, 1958        D. H. KAPLAN        2,835,456
CONTROL MECHANISM FOR A CONVERTIBLE AIRCRAFT
Filed July 13, 1954        2 Sheets-Sheet 2
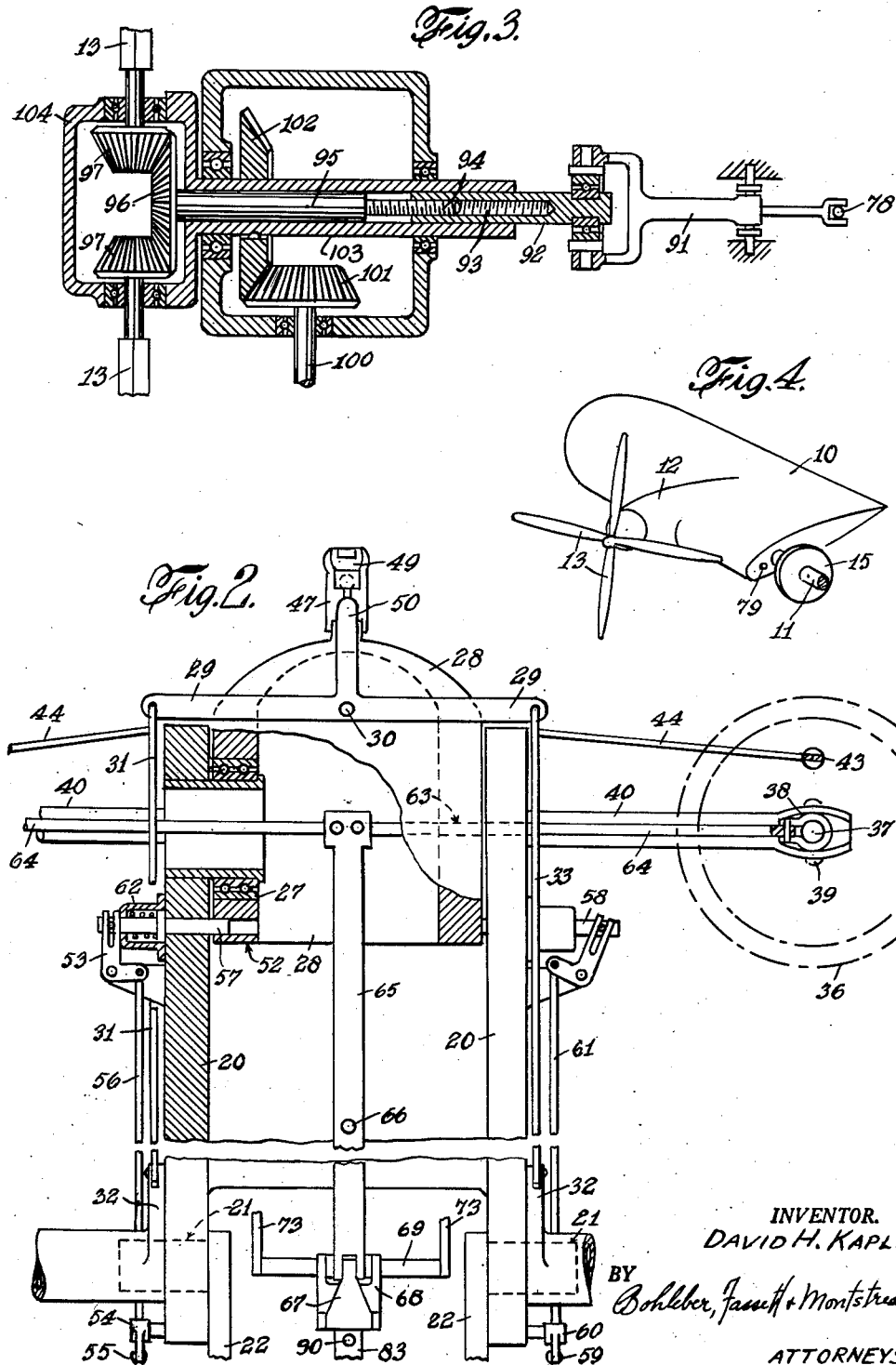
INVENTOR.
DAVID H. KAPLAN
ATTORNEYS United States Patent Office 2,835,456
Patented May 20, 1958

2,835,456

CONTROL MECHANISM FOR A CONVERTIBLE AIRCRAFT

David H. Kaplan, Levittown, N. Y., assignor to Convertawings, Inc., Amityville, N. Y., a corporation of New York Application July 13, 1954, Serial No. 442,939

25 Claims. (Cl. 244—7)

The invention relates to a control mechanism for that type of aircraft which is convertible from conventional airplane operation to helicopter operation. The control mechanism accomplishes action on a pivotally mounted wing unit on each side of the fuselage, and by action on a rotor propeller or jet carried on each wing unit, which can be pivoted to a horizontal position for the wing or vertical position of the plane of the propeller for conventional airplane operation and turned through ninety degrees to a relatively horizontal position for the plane of the propeller for helicopter operation. The wing units are pivotal collectively and inversely during their operation as an airplane and also during their operation as a helicopter, in the latter case controlling the hovering, forward speed or turning of the aircraft when operated as a helicopter. The control mechanism is such that all of these operations are controlled from a single mechanism. Even though the control mechanism is adaptable also for dual control as illustrated herein yet it remains a single operating mechanism. The invention also relates to the combination of the control mechanism and the aircarft.

It is an object of the invention to construct a new and novel control mechanism which controls collective and inverse operation of the wing units for both conventional airplane position and helicopter position.

Another object of the invention is as mentioned in the preceding parapgraph with the addition that it may be constructed for dual control.

Another object of the invention is to construct a control mechanism for an aircraft convertible to and from conventional airplane operation and helicopter operation and controls collective and inverse wing unit adjustment from a single mechanism in both airplane position and helicopter position with means for controlling the collective pitch of the propeller or the throttle of a jet.

It is another of the objects of the invention to provide a control mechanism for a convertible helicopter-airplane aircraft including a control wheel, yoke, or element which is coplanar with the rotor propeller or thrust device at all times when the aircraft is operated as a helicopter, and when the aircraft is operated as an airplane.

It is another object of the invention to provide a control mechanism for a convertible helicopter-airplane aircraft having a control wheel, yoke or element, serving for both phases of flight and that automatically assumes the correct juxtaposition as the aircraft approaches a conversion of type status.

It is another object of the invention to construct a control mechanism including a control wheel, yoke or element, which effects the attitude of the aircraft by said control wheel, yoke or element being moved in the most "natural" manner to achieve the control effect desired.

It is yet another object of the invention to construct a control mechanism for a convertible helicopter-airplane aircraft having a control wheel, yoke or element so linked to hasten a period of conversion from helicopter to airplane, or vice versa, so that intermediate stages are automatically passed in a minimum of time, making the aircraft stallproof, foolproof and safety featured.

It is still another object cf the invention to construct a control mechanism for a convertible helicopter airplane aircraft having a control wheel, yoke or element with control in yaw, pitch and roll, all incorporated in mechanical linkage to said control wheel, yoke or element, eliminating the complexity of the conventional foot controls for yaw, which conventionally operate in reverse to the "natural" manner, as exemplified by a snow sled.

Another object is to construct a combination of the aircraft and the control mechanism set forth above.

Other objects of the invention will be more apparent from the following description when taken in connection with the accompanying drawings illustrating a preferred embodiment thereof in which:

Figure 1 is a perspective view of a portion of one wing of the aircraft and the control mechanism connected thereto. The figure shows the connection to the other wing;

Figure 2 is an enlarged more detailed view of the post and control mechanism with an automatically releasable locking means for the control mechanism;

Figure 3 shows the mechanism for controlling the pitch of the blades of the propeller;

Figure 4 is a small view of a pivoted wing for airplane and helicopter operation; and Figure 5 is a partial view showing the top of the control post.

The aircraft has a fuselage, not shown except as anchor points for parts of the control mechanism, which carries a wing 10 on each side thereof, the wing being pivotally or turnably mounted on the fuselage 14 on an axle 11. The wing preferably carries thrust means such as thrust producing jet or a motor 12 of any suitable kind driving a combined propeller or rotor hereinafter termed a propeller-rotor 13. The axle carries suitable means for turning the wings, that shown being a wheel 15 secured to the axle of each wing and a cable secured to the wheel, and connected with the control mechanism turning the wheel. The control mechanism is fully applicable to an aircraft in which the motor unit alone is turnable through 90° to and from airplane operation to helicopter operation.

The control mechanism includes a post 20 which is pivoted to the fuselage on a horizontal post pivot means 21 in any desired manner such as by a bracket 22 secured to the fuselage of the aircraft. The post is movable forwardly and rearwardly on the post pivot means 21. A wing operating means of any suitable construction is rotatably or pivotally mounted coaxially with the post pivot 21 that particularly shown being a wheel 23 connected with a wing there being one wheel for each wing. This wing operating means or wheel is adapted to be connected with the wing to turn the same, the connecting means particularly shown being a cable 24 and wheel 15.

At the other end of the post there is provided a second or frame pivot means 27 which pivotally or turnably mounts a frame 28 upon the post on an axis parallel with the pivot means 21. A lever 29 is mounted between its ends on a pivot means 30 which lever is spaced from the axis of the frame pivot means 27 so that it swings with the frame. One end of the lever 29 is connected by a link 31 to an arm 32 carried by one of the wheels 23. The other end of the lever 29 is connected by connecting link 33 to a similar arm 32 carried by the other wheel 23 on the other side of the post. The links 31 and 33 provide a parallel linkage with the post.

It will be observed from the mechanism so far described that when the upper end of the post is moved forwardly or rearwardly that the lever 29 moves therewith as a unit so that when the post is pushed forwardly the arms 32 are turned therewith or raised which turns each wing operating means or wheel 23 collectively in a counterclockwise direction and depresses the leading edge of both wings. When the post is moved rearwardly both arms 32 are turned downwardly or in a clockwise direction so that the wings turn in a clockwise direction and the leading edge of both of the wings are turned upwardly. It will be observed also that when the frame 28 is turned on its pivot 27 through 90° that the lever 29 moves therewith which in turn rotates the arm 32 for each wheel 23 through 90° thereby collectively turning the wing or wing units through 90° and converting the aircraft to helicopter operation. The arms 32 should extend about 45° upwardly for aircraft operation so that they extend 45° downwardly for helicopter operation.

The control of the wing units in inverse relation is obtained by a hand wheel 36, yoke or the like hereinafter termed a hand wheel. Dual control is shown so that two spaced wheels 36 are illustrated. The hand wheel is mounted for rotation on the frame 28 on an axle 37 carried by a bracket 38 which is carried on a pivot 39 carried by an extension 40 forming a part of the frame 28. These extensions are provided when dual control is provided and the bracket 38 and its pivot 39 forms no part of inverse control and its purpose will be explained more fully hereinafter.

Each hand wheel 36 is connected with the lever 29 for oscillating the same on its pivot 30. For dual control this is secured through an arm 43 which is rotatable with the handle wheel 36 and which is connected through a link 44 with the arm 29 through a three link extension connection including a plate 45 pivotally connected by a pivot 46 to a second plate 47, the end of which is in turn connected by a pivot 48 with a third plate 49 which is connected with an arm 50 carried by the lever 29. This mechanism is required only for dual control so that for single control the hand wheel 36 merely needs a direct connection between a hand wheel and the lever 29. The plates of the three link connection are wide so that turning of the hand wheel 36 will move the links therewith without relative pivoting and turn the arm 50 to right or left and thereby turn the lever 29 on its pivot 30.

Turning of a hand wheel 36 or 51, turns the arm 43 to pull the connecting link 44 which in turn swings the multiple link connection formed by the plates 45, 47 and 49 to turn the lever 29. When the lever is turned one link 31 is moved downwardly and the other is moved upwardly or in inverse directions which in turn rotates each wheel 23 in an inverse direction with respect to the other and swings or pivots the wing units in inverse direction.

When the frame 28 is pivoted through 90° to convert the aircraft from the conventional airplane to helicopter operation the wheels 36 are swung from a vertical plane or substantially vertical plane to a horizontal or substantially horizontal plane. In this position the post may be swung on its pivot means 21 forwardly and rearwardly to give collective control of the wing units exactly in the same fashion as for airplane operation. Also by turning the hand wheels inverse control of the wing units is obtained in the same manner as when in position for airplane operation. Locking means are preferably provided of any suitable form to lock the frame 28 in position against rotation on the post 20. The locking means also is constructed preferably so that it will not turn during a normal extent of forward and rearward pivoting of the post, but if the post is moved far enough rearwardly to about stall position for the wings, the frame 28 is automatically unlocked. This is accomplished in the construction particularly illustrated by a lever 54 carried by the post and engaging a bumper or shoulder 55 carried by the frame of the fuselage. This lever is connected with a rod 56 which swings a bell-crank lever 53 and this lever withdraws a lock pin 57 from engagement in a lock hole 52 in the frame 28. The lock pin is pressed into the hole by a spring 62. This permits the frame 28 to be turned through 90° to helicopter position or operation whereupon a like pin 58 drops or is pressed into a hole 63 in the frame 28 and locks the latter in this 90° or helicopter position.

If now the post is pushed forward far enough the bumper or shoulder 59 carried by the fuselage of the aircraft engages a lever 60 which operates the rod 61 to remove the pin 58 from locking engagement with the frame 28 whereupon the frame and hand wheels 36 may be turned through a return 90° to restore the frame 28 to airplane operation. The pin 58 and its connection with the rod 61 is like that shown in Figure 2.

The control mechanism may be constructed to control also the pitch of the propellers. This is accomplished through the pivoting of the bracket 38 on the pivot 39. The connection between the arm 43 and its link 44 is made in line with the axis of the pivot 39 when the bracket 38 is in central position. When in central position, rocking of the hand wheel 36 to right or left does not change the position of the link 44. The bracket is connected by a rod 64 to a lever 65 which is pivoted to the post or a pivot 66 whose axis extends in a fore and aft direction or a direction longitudinally of the aircraft. The lever 65 is connected through wide links 67 and 68 with an arm 69 pivoted between its ends on a pivot 70. The connection between pitch control lever 65 and link 67 is coaxial with the pivot means 21. The links 67 and 68 are provided to permit movement of the arm 69 forward and rearwardly as will appear more fully hereinafter.

One end of the arm 69 is connected by links 73, 74, 75, 76 and 77 with a thrust control rod 78 which extends down through an opening 79 through the wing 10 and is connected with the pitch control means of the propeller to move the same for collective pitch control of the propeller or to a throttle valve 80 of a jet 81 carried by the wing. The links 76 and 77 are provided to permit connection between the link 75 and the control rod 78 irrespective of the position of the wing 10. The other end of the arm 69 is similarly connected to the pitch control means of the propeller carried by the motor on the other wing of the aircraft. It will be observed therefore that by rocking the handle wheel 36 sideways, the arm 69 is pivoted on pivot 70 to push one pitch control rod 78 outwardly of the wing and the corresponding pitch control rod for the other wing inwardly. In other words lateral movement of a handle wheel 36 provides differential or inverse control of the pitch of one propeller with respect to the other.

Collective control of the pitch of the propeller may be secured throught a hand lever 82 mounted on a pivot 89 which lever is connected by a rod 90 with a pitch control post 83, the lower end of which is mounted on a pivot 84 carried by the fuselage. The post 83 carries the pivot 70 for the lever 69. A foot pedal 85 may also be provided which is connected by a rod 86 with a lever 87 which is connected by a link 88 with the post 83. Either the hand lever or the foot pedal pivots the post forwardly or rearwardly and moves the arm 69 forwardly and rearwardly therewith without pivoting the same. This movement, therefore, collectively increases and decreases the pitch of both of the propellers.

Pitch control of the propellers is secured by any suitable means which operates upon longitudinal movement of the rod 78. The pitch control means shown in Figure 3 is a crank or lever 91 connected with the push rod pitch control or push rod 78 to move the screw nut 92 longitudinally. It carries a high pitch screw thread 93 which engages the screw threads 94 on a shaft 95 carrying a gear 96. Each blade 13 of the propeller carries a pinion 97 each of which meshes with the gear 96. Longitudinal movement of the nut 92 turns the shaft 95, gear 96 and pinions 97 to change the pitch of the blades of the propeller 13.

The propeller is rotated in any desired manner such as by a drive shaft 100 through gears 101 and 102 which turns the shaft 103 and the propeller head 104. The drive shaft 100 is driven by a motor carried by the wing or other part of the aircraft.

While it will be thus observed from the foregoing and from the illustrations that the forces necessary to move the control surfaces are supplied directly by the pilot, it is to be understood that this same control wheel, yoke or element and linking mechanism is the same invention when the control mechanism operates or controls the operation of boosters of any type to magnify the forces supplied by the pilot. Also, the linkages that actuate the wings collectively and inversely are the same invention should they operate the propeller pitch cyclically, or by aerodynamic tab. The use of hydraulic boosters is well-known and conventional for all large aircraft and needs no elaboration herein. Also, the use of cyclic pitch in the control of helicopters is well-known, conventional, and needs no elaboration herein. Likewise, the aerodynamic trim tab is well-known, conventional and needs no elaboration herein.

The invention is presented to fill a need for improvements in a control mechanism for a convertible aircraft and the aircraft. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A control mechanism for a convertible aircraft having a pivoted wing extending from each side of the fuselage thereof and carrying a thrust means, comprising a control post, pivot means carried by the control post for pivotally mounting the latter to the fuselage, a frame pivotally mounted upon the control post and movable through 90° relatively to the post, wing operating means for each wing connected with a wing to turn the latter, connecting means from the pivotally mounted frame to the wing operating means to operate the latter for a 90° movement whereby pivoting of the post collectively operates the wing operating means a limited amount in the same direction and turning of the frame relatively to said post collectively operates the wing operating means for a 90° movement, and a hand wheel mounted on the frame, the hand wheel turning through 90° with the frame when the frame is turned through 90° relatively to said post whereby the pivotal movement of the control post controls collective operation of the wing operating means for helicopter and airplane operation.

2. A control mechanism as in claim 1 including releasable means locking the frame at each end of its 90° pivotal movement.

3. A control mechanism as in claim 2 including means automatically operable on a predetermined extent of pivotal movement of the control post to release the locking means.

4. A control mechanism for a convertible aircraft having a pivoted wing extending from each side of the fuselage thereof and carrying a thrust means, comprising a control post, pivot means carried by the control post for pivotally mounting the latter to the fuselage, a frame pivotally mounted upon the control post and movable through 90° relatively to the post, wing operating means for each wing connected with a wing to turn the latter, a lever pivotally mounted between its ends upon the frame and spaced from the pivotal mounting for the frame, a connection from one end of the lever to one wing operating means and a connection from the other end of the lever to the other wing operating means whereby pivoting of the control post collectively operates both wing operating means a limited amount in the same direction and turning of the frame through 90° with respect to said post collectively operates the wing operating means to pivot the wings through 90°, and a hand wheel rotatably mounted on the frame and connected with the lever to turn the same for inverse operation of the wing operating means, the hand wheel also turning through 90° with the frame when the frame is turned through 90° relatively to said post whereby the control post and hand wheel controls collective and inverse operation of the wing operating means for helicopter and airplane operation.

5. A control mechanism as in claim 4 including releasable means locking the frame at each end of its 90° pivotal movement.

6. A control mechanism as in claim 5 including means automatically releasing the locking means upon a predetermined extent of pivotal movement of the control post.

7. A control mechanism for a convertible aircraft having a pivoted wing extending from each side of the fuselage thereof and carrying a thrust means, comprising a control post, a first pivot means at one end of the post adapted to pivotally mount the same to the fuselage, a second pivot means carried upon the other end of the control post, a frame mounted upon the second pivot means and movable through 90° with respect to said post, wing operating means on each side of the post and pivotally mounted coaxially with the first pivot means, each wing operating means connected with a wing to turn the latter, a lever pivotally mounted between its ends upon the frame and spaced from the axis of the second pivot means mounting therefor, a connection from one end of the lever to one wing operating means and a connection from the other end of the lever to the other wing operating means whereby pivoting of the post collectively operates the wing operating means a limited amount in the same direction and turning of the frame relatively to the post collectively operates the wing operating means through 90°, and a hand wheel rotatably mounted on the frame and connected with the lever to turn the same for inverse operation of the wing operating means, the hand wheel also turning through 90° with the frame when the frame is turned through 90° with respect to the post whereby the control post and hand wheel controls collective and inverse operation of the wing operating means for helicopter and airplane operation.

8. A control mechanism as in claim 7 including means to lock the frame upon the post.

9. A control mechanism as in claim 7 including means to lock the frame upon the post, and means operable upon a predetermined extent of movement of the post to automatically release the lock means.

10. A control mechanism as in claim 7 including a first lock means to lock the frame upon the post in its airplane operation position, means operable upon a predetermined rearward movement of the post to automatically release the lock means, a second lock means to lock the frame upon the post in its helicopter position, and means operable upon a predetermined forward movement of the post to automatically release the second lock means.

11. A control mechanism for an aircraft having a pivoted wing extending from each side of the fuselage thereof and carrying a propeller-rotor and pitch control means for the blades of the propeller-rotor comprising a control post, a first pivot means at one end of the control post pivotally mounting the same to the fuselage, wing operating means on each side of the post and pivotally mounted coaxially with the pivot means, each wing operating means connected with a wing to turn the latter, a lever pivotally mounted between its ends upon the upper end of the control post, a connection from one end of the lever to one wing operating means and a connection from the other end of the lever to the other wing operating means whereby pivoting of the post collectively operates the wing operating means, a wheel bracket pivotally mounted on the upper end of the control post for movement of the bracket to each side, a hand wheel rotatably mounted on the bracket and connected with the lever to turn the same for inverse operation of the wing operating means whereby the control post and hand wheel control collective and inverse operation of the wing operating means, a pitch control lever pivotally mounted vertically on the control post and having an upper end and a lower end, a connection from the wheel bracket to one end of the pitch control lever, and a connection from the lower end of the pitch control lever connected with pitch control means for the blades of the propeller.

12. A control mechanism for aircraft as in claim 11 including a second pivotally mounted lever, a connection from the pitch control lever on the control post to the second lever, a push rod for each wing extending through its wing and mounted for longitudinal movement, a connection from one end of the second lever to the push rod for one wing to move the same longitudinally, a connection from the other end of the second lever to the push rod for the other wing to move the same longitudinally.

13. A control mechanism as in claim 12 including a pitch control post pivotally mounted for fore and aft movement, the second lever being pivotally mounted on the pitch control post, and means connected to the pitch control post to move the same fore and aft and for collective control of the push rods.

14. A convertible aircraft comprising a fuselage, a pivoted wing extending from each side of the fuselage and carrying a propeller-rotor; a control mechanism including a control post pivotally mounted to the fuselage, a frame pivotally mounted upon the control post spaced from the pivotal mounting of the post and movable through 90° with respect to said post, wing operating means for each wing and connected therewith to pivot the same, connecting means from the pivotally mounted frame to the wing operating means to operate the same for a 90° wing movement whereby pivoting of the post collectively operates the wing operating means a limited amount in the same direction and turning of the frame relatively to the post collectively operates the wing operating means for a 90° wing movement, and a hand wheel mounted on the frame, the hand wheel turning through 90° with the frame when the frame is turned through 90° with respect to said post whereby the pivotal movement of the control post controls collective operation of the wing operating means and the wings for helicopter and airplane operation.

15. A convertible aircraft as in claim 14 including releasable means locking the frame at each end of its 90° pivotal movement.

16. A convertible aircraft as in claim 14 including means automatically operable on a predetermined extent of pivotal movement of the control post to release the locking means.

17. A convertible aircraft as in claim 14 including the hand wheel being mounted on the frame in co-planar position with respect to the propeller-rotor.

18. A convertible aircraft comprising a fuselage, a pivoted wing extending from each side of the fuselage and carrying a propeller-rotor; and a control mechanism including a control post pivotally mounted to the fuselage, a frame pivotally mounted upon the control post and movable through 90° with respect to said post, wing operating means for each wing and connected therewith to pivot the same, a lever pivotally mounted between its ends upon the frame and spaced from the pivotal mounting for the frame, a connection from one end of the lever to one wing operating means and a connection from the other end of the lever to the other wing operating means whereby pivoting of the control post collectively operates both wing operating means a limited amount in the same direction and turning of the frame through 90° with respect to said post collectively operates the wing operating means to pivot the wings through 90°, and a hand wheel rotatably mounted on the frame and connected with the lever to turn the same for inverse operation of the wing operating means, the hand wheel also turning through 90° with the frame when the frame is turned through 90° whereby the control post and hand wheel controls collective and inverse operation of the wing operating means and wings for helicopter and airplane operation.

19. A convertible aircraft as in claim 18 including releasable means locking the frame at each end of its 90° pivotal movement.

20. A convertible aircraft as in claim 19 including means automatically releasing the locking means upon a predetermined extent of pivotal movement of the control post.

21. A convertible aircraft as in claim 19 including the hand wheel being mounted on the frame in co-planar position with respect to the propeller-rotor.

22. A convertible aircraft comprising a fuselage, a pivoted wing extending from each side of the fuselage and carrying a propeller-rotor; and a control mechanism including a control post, a first pivot means at one end of the post pivotally mounted to the fuselage, a second pivot means carried upon the other end of the control post, a frame mounted upon the second pivot means and movable through 90° with respect to said post, wing operating means on each side of the post and pivotally mounted coaxially with the first pivot means, each wing operating means being connected with a wing to turn the latter, a lever pivotally mounted between its ends upon the frame and spaced from the axis of the second pivot means mounting therefor, a connection from one end of the lever to one wing operating means and a connection from the other end of the lever to the other wing operating means whereby pivoting of the post collectively operates the wing operating means a limited amount in the same direction and turning of the frame through 90° with respect to said post collectively operates the wing operating means to turn the wing through 90°, and a hand wheel rotatably mounted on the frame and connected with the lever to turn the same for inverse operation of the wing operating means, the hand wheel also turning through 90° with the frame when the frame is turned through 90° with respect to said post whereby the control post and hand wheel controls collective and inverse operation of the wing operating means and the wings for helicopter and airplane operation.

23. A convertible aircraft comprising a fuselage, a wing pivotally mounted upon each side of the fuselage for movement through at least 90°, a propeller-rotor carried by the wing with blades mounted for pitch change, pitch change means connected with the blades; control mechanism including a control post pivotally mounted to the fuselage, wing operating means for each wing connected with a wing to turn the latter, a lever pivotally mounted between its ends upon the control post and spaced from the pivotal mounting therefor, a connection from one end of the lever to one wing operating means and a connection from the other end of the lever to the other wing operating means whereby pivoting of the control post collectively operates both wing operating means, a hand wheel bracket pivotally mounted on the upper end of the control post for movement of the bracket to each side, a hand wheel rotatably mounted on the bracket and connected with the lever to turn the same for inverse operation of the wing operating means and of the wings, pivot means carried by the control post and extending horizontally fore and aft thereon, a pitch control lever carried upon the pivot means and extending vertically of the control post with an upper end and a lower end, a connection from the wheel bracket to the upper end of the pitch control lever, and a connection from the lower end of the pitch control lever to the pitch change means.

24. An aircraft as in claim 23 including a second pivotally mounted lever, a connection from the pitch control lever on the control post to the second lever, a push rod for each wing adapted to extend through its wing and mounted for longitudinal movement, a connection from one end of the second lever to the push rod for one wing to move the same longitudinally, a connection from the other end of the second lever to the push rod for the other wing to move the some longitudinally.

25. An aircraft as in claim 24 including a pitch control post pivotally mounted for fore and aft movement, the second lever being pivotally mounted on the pitch control post, and means connected to the pitch control post to move the same fore and aft for collective control of the push rods.

References Cited in the file of this patent
UNITED STATES PATENTS

| | | |
|---|---|---|
| 1,167,874 | Backus | Jan. 11, 1916 |
| 1,304,525 | Leaman | May 20, 1919 |
| 1,951,817 | Blount | Mar. 20, 1934 |
| 2,621,001 | Roman | Dec. 9, 1952 |

FOREIGN PATENTS

| | | |
|---|---|---|
| 252,266 | Great Britain | May 28, 1926 |